H. STOCKHEIM.
FILTER BASIN FOR BREWING PURPOSES.
APPLICATION FILED MAY 22, 1909.
953,495.
Patented Mar. 29, 1910.
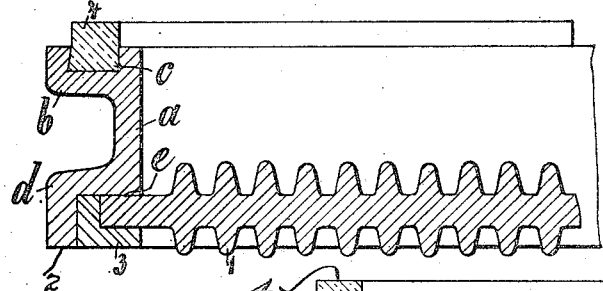
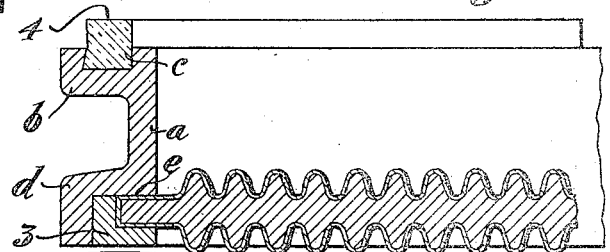
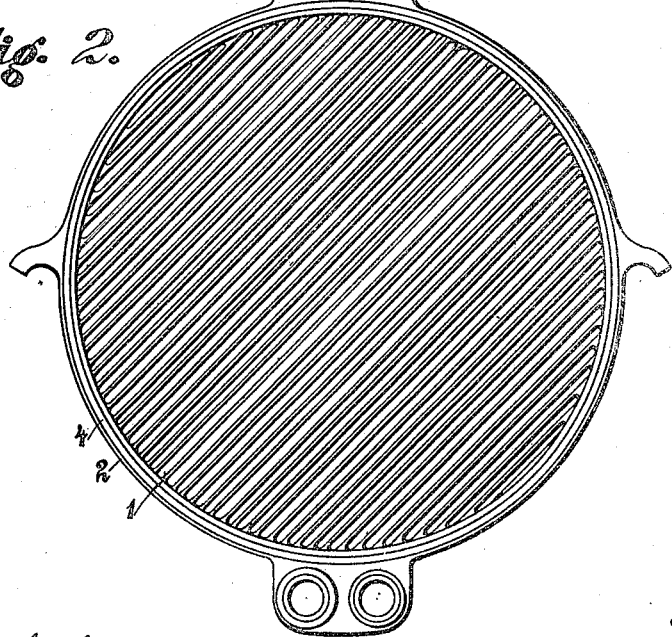
Inventor
Heinrich Stockheim
by Harold Serrell
his atty

UNITED STATES PATENT OFFICE.

HEINRICH STOCKHEIM, OF MANNHEIM, GERMANY.

FILTER-BASIN FOR BREWING PURPOSES.

953,495.  Specification of Letters Patent.  Patented Mar. 29, 1910.

Application filed May 22, 1909. Serial No. 497,794.

*To all whom it may concern:*

Be it known that I, HEINRICH STOCK-HEIM, a subject of the Grand Duke of Baden, Germany, residing in Mannheim, Baden, Germany, have invented an Improvement in Filter-Basins for Brewing Purposes, of which the following is a specification.

Heretofore so far as I am aware, filters used for brewing purposes have commonly comprised a plurality of superimposed separate filter basins, each of which has comprised a frame or body member with a sieve or grate bottom, which latter is commonly made of metal coated with a surface of tin to prevent the formation of verdigris. It has been found that this coating of tin tends to cause a so-called metallic turbidity of the beer, or in other words, there is an acid reaction tending to give the beer a metallic taste and also to produce more or less of a sediment therein, and for this reason the sieve or grate bottoms of the filter basins have also been given a coat of varnish, which as will be understood, was short-lived due to the fact that these filter basins are frequently cleaned by means of mordant lyes, hot water and stiff brushes. More recently these filter basins have been constructed entirely of such a material as would render them free from the objection of causing any metallic turbidity in the beer, and this material has commonly been hard rubber. Filter basins constructed of this material have served their purpose, but from the fact that they are necessarily brittle, they exert little or no resistance to the hard use to which they are subjected and consequently they frequently break to pieces.

Now the object of my present invention is to overcome the hereinbefore named difficulties, and in carrying out the same I provide a filter basin in which the frame or body member is made of metal, a grate or sieve bottom therefor which is so constructed as to have a surface of hard rubber, and means whereby the said sieve or grate bottom is secured in position within the frame or body member of the filter basin.

In the drawing, Figure 1 is a partial cross section of a filter basin illustrating my present invention, Fig. 2 is a plan view of the same on a reduced scale, and Fig. 3 is a cross section illustrating a modified form of my invention.

Referring particularly to the drawing, my improved filter basin preferably comprises a frame or body member $a$ which as illustrated is circular in configuration but which as will be understood, may be of any other form. This frame member $a$ is provided with end flanges $b$ $d$ respectively; the end flange $d$ being provided with a recess $e$.

The numeral 1 represents a sieve or grate bottom which is preferably made of caoutchouc or hard rubber, or may be made with a metallic frame covered with a substantial coating of hard rubber so that the surface which comes into contact with the beer will be made of this material; the sieve being provided with a series of slots or apertures.

3 designates a ring adapted to fit within the recess $e$ in the flange $d$. This ring 3 is also preferably recessed so as to receive the periphery of the sieve or grate member 1 which as plainly illustrated in Fig. 1, fits between the ring 3 and the inner surface of the recess $e$; the ring 3 being of a thickness corresponding with the depth of the recess $e$ so that the lower surface of the same when the parts are together, comes approximately flush with the under surface 2 of the flange $d$.

The flange $b$ is provided with a groove $c$ in which as illustrated in Fig. 1, a gasket 4 is fitted, upon which as will also be understood, the next adjacent superimposed filter basin of the filter is placed and supported.

It will be seen that by the use of the hereinbefore described filter basin, the grate or sieve bottoms being made of hard rubber or of other material coated with hard rubber as is indicated in Fig. 3, there will be no action on the beer in tapping the same and passing through the filters and also that this construction makes it possible to readily remove the grate or sieve bottom whenever it shall have become worn or otherwise defective, and in so doing it is not necessary to replace the entire filter basin as has heretofore been the case.

I claim as my invention:

1. A filter basin comprising a metallic body member, a separable grate bottom therefor whose surface is of hard rubber, and means for securing the said grate bottom within said body thereof.

2. A filter basin for brewing purposes, comprising a circular body member, a grate bottom whose surface is of hard rubber, and a ring fitting within the said body member and provided with a recess for receiving said grate bottom.

3. A filter basin for brewing purposes, comprising a circular metallic body member, flanges at the extremities of the same, one of said flanges being provided with a recess, a hard rubber grate bottom for said body member and a ring adapted to be received within the said recess in the said flange of the body member, the said ring being also provided with a recess adapted to receive the periphery of the said grate bottom.

Signed by me this 7th day of May, 1909.

HEINRICH STOCKHEIM.

Witnesses:
N. K. SHANK,
P. PIRCHHART.